United States Patent
Singh

(10) Patent No.: US 9,421,923 B1
(45) Date of Patent: Aug. 23, 2016

(54) VEHICLE FLOOR WITH FEATURES FOR LOCATING CARPETING DURING ASSEMBLY

(71) Applicant: Toyota Motor Engineering & Manufacturing North America, Inc., Erlanger, KY (US)

(72) Inventor: Dilpreet Singh, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/838,691

(22) Filed: Aug. 28, 2015

(51) Int. Cl.
  *B60R 13/08* (2006.01)
  *B62D 25/20* (2006.01)
  *B60N 3/04* (2006.01)

(52) U.S. Cl.
  CPC ............. *B60R 13/083* (2013.01); *B60N 3/042* (2013.01); *B62D 25/20* (2013.01)

(58) Field of Classification Search
  CPC ...... B60R 13/083; B60N 3/04; B60N 3/042; B60N 3/046
  USPC .............................. 296/39.3, 97.23, 193.07
  See application file for complete search history.

(56) References Cited

U.S. PATENT DOCUMENTS

| | | | | |
|---|---|---|---|---|
| 5,192,599 A | * | 3/1993 | Sakamoto | A47G 27/0418 16/16 |
| 5,474,829 A | * | 12/1995 | Woosley | B60N 3/048 112/410 |
| 5,573,294 A | * | 11/1996 | Mack | B60N 3/042 16/4 |
| 5,876,826 A | * | 3/1999 | Hoffmann | B60N 3/042 156/72 |
| 6,145,907 A | | 11/2000 | Maruyama et al. | |
| 2004/0062902 A1 | * | 4/2004 | Henry | B60N 3/042 428/92 |
| 2007/0194592 A1 | * | 8/2007 | Lindsay | B60R 13/083 296/97.23 |
| 2011/0248524 A1 | * | 10/2011 | Wendling | B60N 3/042 296/97.23 |
| 2014/0302285 A1 | * | 10/2014 | Ikeji | B32B 5/245 428/161 |

FOREIGN PATENT DOCUMENTS

| | | |
|---|---|---|
| EP | 1382514 A1 | 1/2004 |
| WO | 2007148440 A1 | 12/2007 |

OTHER PUBLICATIONS

Chrysler, "Chrysler Workshop Manuals", Retrieved from the Internet, Retrieved Aug. 4, 2015, (1 page).

* cited by examiner

*Primary Examiner* — Jason S Morrow
(74) *Attorney, Agent, or Firm* — Christopher G. Darrow; Darrow Mustafa PC

(57) ABSTRACT

A vehicle floor includes a rigid floor structure having a datum location, and a compressible sound attenuating silencer and carpeting both shaped to correspond to the shape of the floor structure. The silencer overlies the floor structure and defines a relief in a section overlying the floor structure's datum location. The carpeting overlies the silencer and has a locator in a section overlying the floor structure's datum location. The locator is accommodated within the silencer's relief and applied against the floor structure's datum location to locate at least some of the carpeting with respect to the floor structure in a direction of the application.

20 Claims, 4 Drawing Sheets

VEHICLE FLOOR WITH FEATURES FOR LOCATING CARPETING DURING ASSEMBLY

TECHNICAL FIELD

The embodiments disclosed herein generally relate to vehicles and vehicle assembly, and more particularly to the assembly of vehicle floors.

BACKGROUND

The body of a typical vehicle has a floor with a rigid floor structure. In these vehicles, the passenger compartment is usually defined in part by a floor covering for the floor structure. This floor covering may include, for instance, a compressible sound attenuating silencer overlying the floor structure and carpeting overlying the silencer.

In some vehicles, the floor structure may have many surface features and, as a result, a complex surface geometry, and to accommodate the floor structure's complex surface geometry, both the silencer overlying the floor structure and the carpeting overlying the silencer may be shaped to correspond to the shape of the floor structure. With the floor structure, the silencer and the carpeting all having corresponding shapes, during the assembly of these vehicles, it is desirable for the silencer and the carpeting to be properly located with respect to the floor structure.

SUMMARY

Disclosed herein are embodiments of vehicle floors. In one aspect, a vehicle floor includes a rigid floor structure having a datum location, and a compressible sound attenuating silencer and carpeting both shaped to correspond to the shape of the floor structure. The silencer overlies the floor structure and defines a relief in a section overlying the floor structure's datum location. The carpeting overlies the silencer and has a locator in a section overlying the floor structure's datum location. The locator is accommodated within the silencer's relief and applied against the floor structure's datum location to locate at least some of the carpeting with respect to the floor structure in a direction of the application.

In another aspect, a vehicle floor includes a rigid floor structure having a datum location at a transversely extending upright face of a raised cross member for floor structure, and a compressible sound attenuating silencer and carpeting both shaped to correspond to the shape of the floor structure. The silencer overlies the floor structure and defines a relief hole in a section overlying the floor structure's datum location. The carpeting overlies the silencer and has opposed longitudinally extending peripheral edges and a recessed locating handhold formed into an inner section overlying the floor structure's datum location. The carpeting's peripheral edges are anchored to the floor structure to locate at least some of the carpeting with respect to the floor structure in a transverse direction, and its recessed locating handhold is applied in contact against the floor structure's datum location through the silencer's relief hole in a longitudinal direction to locate at least some of the carpeting with respect to the floor structure in the longitudinal direction of the application.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle floor that includes a rigid floor structure, and a compressible sound attenuating silencer and carpeting both shaped to correspond to the shape of the floor structure. The floor structure has a datum location, a relief is defined in a section of the silencer overlying the floor structure's datum location, and the carpeting has a locator accommodated within the silencer's relief and applied against the floor structure's datum location during the vehicle's assembly. This locates at least some of the carpeting with respect to the floor structure in a direction of the application, without anchoring the locator or bordering portions of the carpeting to the datum location or bordering portions of the floor structure.

Figure 1:
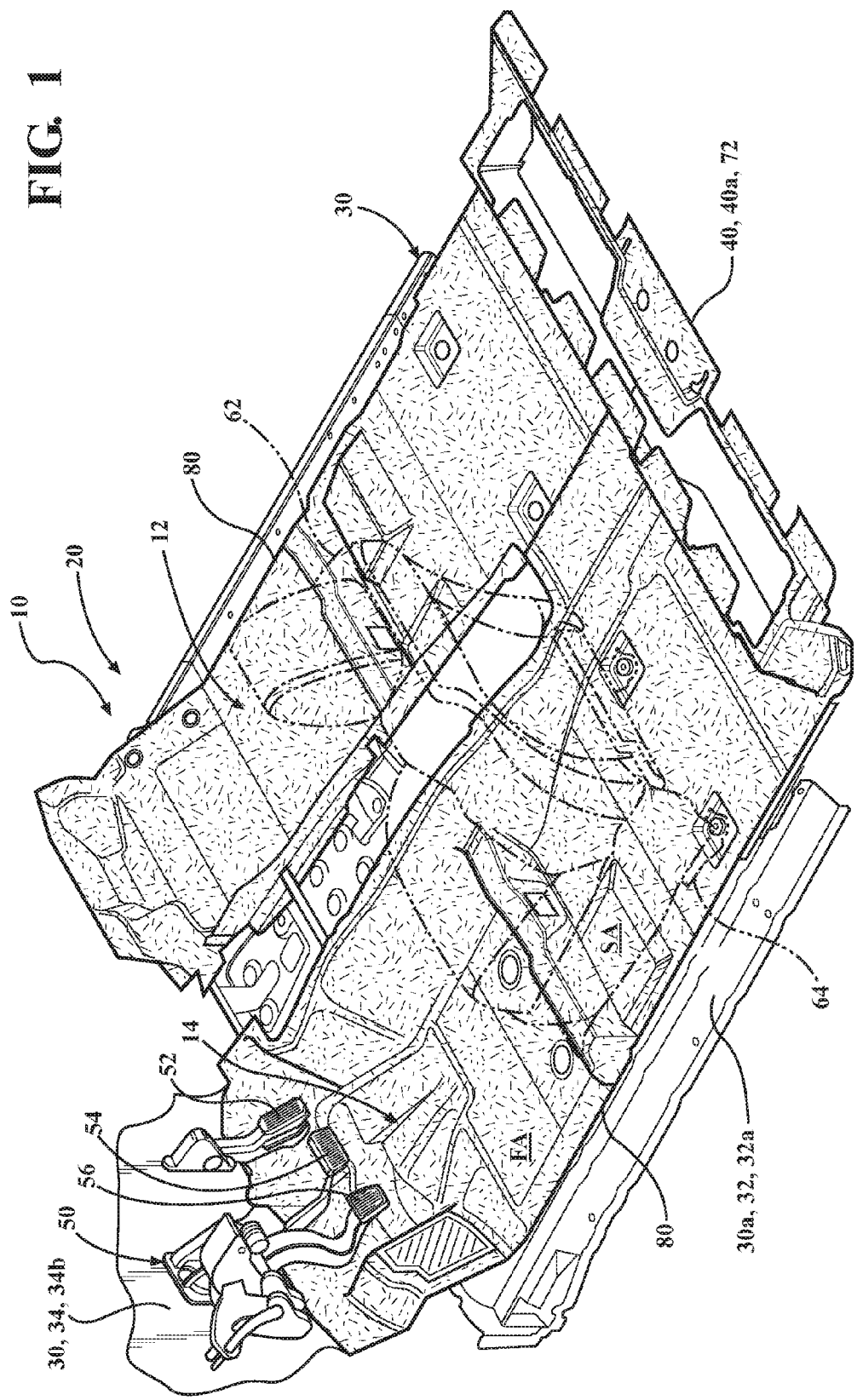
FIG. 1 is an assembly view of a part of a vehicle that has a pedal assembly and a floor, showing a floor structure and a floor covering for the floor structure, with carpeting of the floor covering being visible.

A part of a representative vehicle 10 is shown in FIG. 1. In this description, uses of "front," "forward" and the like, and uses of "rear," "rearward" and the like, refer to the longitudinal direction of the vehicle 10. "Front," "forward" and the like refer to the front (fore) of the vehicle 10, while "rear," "rearward" and the like refer to the back (aft) of the vehicle 10.

The vehicle 10, of which a part is shown in FIG. 1, has a number of inner compartments, including a passenger compartment 12 with a recessed footwell 14 for accommodating the feet and outstretched legs of a driver of the vehicle 10.

The vehicle 10 has a body that forms the exterior of the vehicle 10 and defines the passenger compartment 12 and other interior compartments. For the part of the vehicle 10 shown, the body has a floor 20. For other parts of the vehicle 10, it will be understood that the body may further have upright sides with doors, a front end, a rear end, a roof and a hood, among other things.

The body includes a rigid body structure 30 constructed from, among other things, interconnected frame members 32 and body panels 34, as well as coverings 40 overlying the inside of the body structure 30. The body structure 30 encloses the passenger compartment 12 and other interior compartments, and for one, some or all of the inner compartments enclosed by the body structure 30, the coverings 40 overly otherwise exposed portions of the inside of the body structure 30 enclosing those inner compartments. The coverings 40 may be cosmetic or functional, or both, and may be, or include, paneling, trim or upholstery, or any combination of these. In general, for a given inner compartment, the coverings 40, together with exposed portions of the inside of the body structure 30, if any, define the interior compartments of the vehicle 10, in whole or in part.

Figure 2:
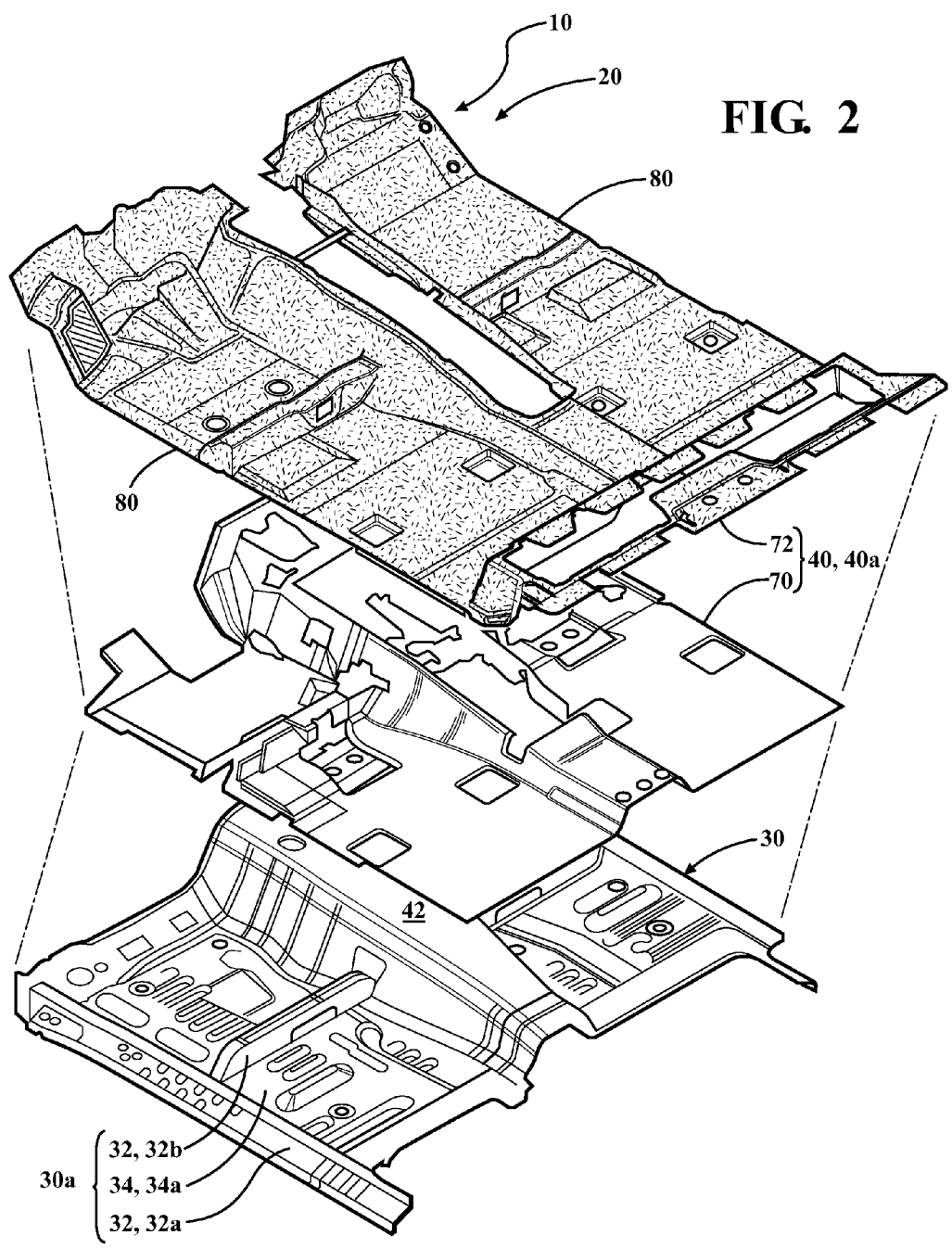
FIG. 2 is an exploded view of the floor of the part of the vehicle shown in FIG. 1, with a silencer of the floor covering additionally being visible.

With additional reference to FIG. 2, for the part of the vehicle 10 shown, the frame members 32 of the body structure 30 include a pair of spaced longitudinally extending side rails 32a and one or more transversely extending cross members 32b (one visible, with the other being a mirror image), and the body panels 34 of the body structure 30 include a horizontally disposed floor pan 34a with a raised, longitudinally extending transmission tunnel 42 and an upright firewall 34b separating the passenger compartment 12 from an engine compartment or other interior compartment defined by the body forward of the passenger compartment 12.

For the floor 20 of the body, the pair of spaced longitudinally extending side rails 32a, transversely extending cross members 32b and the floor pan 34a collectively form a floor structure 30a, the inside of which encloses, in part, the passenger compartment 12 of the of the vehicle 10. In the floor structure 30a, the floor pan 34a is connected between the pair of spaced longitudinally extending side rails 32a, and the transversely extending cross members 32b are each connected to the floor pan 34a and between its transmission tunnel 42 and a respective one of the pair of spaced longitudinally extending side rails 32a. The firewall 34b is connected to the front of the floor pan 34a, with portions of the firewall 34b bordering the front of the floor pan 34a additionally forming the floor structure 30a, and with the front of the floor pan 34a and the firewall 34b enclosing, in part, the footwell 14 of the passenger compartment 12.

The floor 20 of the body includes a floor covering 40a for the floor structure 30a. The floor covering 40a overlies otherwise exposed portions of the inside of the floor structure 30a and defines, together with exposed portions of the inside of the floor structure 30a, if any, the passenger compartment 12, in whole or in part. For the part of the vehicle 10 shown, the passenger compartment 12 is largely defined by the floor covering 40a, although for other parts of the vehicle 10, it will be understood that the passenger compartment 12 may further be defined by other coverings 40 and window panels, for instance, together with exposed portions of the inside of the body structure 30, if any.

In the passenger compartment 12, the vehicle 10 includes, among other things, a pedal assembly 50. The pedal assembly 50 includes an accelerator pedal 52, a brake pedal 54 and an optional clutch pedal 56, each of which is pivotally connected to the firewall 34b for manual depression from a rearward release position to one or more forward actuation positions and for automatic return movement to the release position, and positioned in suspension in the footwell 14 over a driver's side footwell area FA of the floor 20.

The vehicle 10 further includes seats housed in its passenger compartment 12, which are represented by a driver's seat 62. Although these seats are represented by the driver's seat 62, it will be understood that other seats may be housed in the passenger compartment 12, such as a passenger seat and one or more rear seats. The driver's seat 62 includes a mounting bracket 64 mounted to the floor structure 30a at a driver's seat area SA of the floor 20 rear of, but bordering, the driver's side footwell area FA. The mounting bracket 64 supports the remainder of the driver's seat 62 in position in the passenger compartment 12, rear of the footwell 14, over the driver's side footwell area FA.

As shown particularly with reference to FIG. 2, the floor covering 40a for the floor structure 30a includes a sound attenuating silencer 70 overlying the floor structure 30a and carpeting 72 overlying the silencer 70. Although the floor covering 40a could include additional interleaved components, as shown, the silencer 70 rests in contact on the floor structure 30a, and the carpeting 72 rests in contact on the silencer 70. More specifically, with the silencer 70 defining a bottom surface and a top surface, and the carpeting 72 similarly defining a bottom surface and a top surface, the bottom surface of the silencer 70 rests in contact on the floor structure 30a, and the bottom surface of the carpeting 72 rests in contact on the top surface of the silencer 70, with the top surface of the carpeting 72 being that which largely defines the passenger compartment 12 for the part of the vehicle 10 shown.

The silencer 70 is generally configured to absorb, deflect, or otherwise attenuate the transmission of sound waves from the outside of the vehicle 10 to its passenger compartment 12 via the floor structure 30a and other portions of the body structure 30 which it overlays, such as the upper portions of the firewall 34b. The silencer 70 may be particularly configured to attenuate the transmission of sound waves representing noise, vibration and harshness (NVH), for example. The silencer 70 may be composed of any suitable material or combination of materials. The material of the silencer 70 may be, or include, recycled cotton or polyethylene terephthalate (PET) fibers, together with any suitable binder, for example.

As a product of its material, the silencer 70 is manually compressible either by hand, for instance during the assembly of the vehicle 10, or by the pressure of a resting foot of a driver of the vehicle 10, for instance during the operation of the vehicle 10. In these and other cases of manual compression, the silencer 70 may be generally resilient and capable of substantially returning to an uncompressed condition. In this description, unless a compressed condition is referenced, the discussion of the features of the silencer 70 assumes an uncompressed condition.

The carpeting 72 is generally configured to provide a durable but attractive outer layer to the floor covering 40a. The carpeting 72 may but need not contribute to the attenuation of the transmission of sound waves by the silencer 70. The carpeting 72 may be any automotive grade carpeting composed of any suitable material or combination of materials.

As generally shown, the floor structure 30a has many surface features and, as a result, a complex surface geometry, both as a product of the individual surfaces of the components of the floor structure 30a and as a product of their interconnection with one another to form the floor structure 30a. To accommodate the complex surface geometry of the floor structure 30a, both the silencer 70 and the carpeting 72 are shaped to correspond to the shape of the floor structure 30a. More specifically, where the silencer 70 rests in contact on the floor structure 30a, and the carpeting 72 rests in contact on the silencer 70, the bottom surface of the silencer 70 is shaped to match the shape of the floor structure 30a, which is generally maintained at the top surface of the silencer 70, and the bottom surface of the carpeting 72 is shaped to match the shape the top surface of the silencer 70. The silencer 70 may, for example, be vacuum formed in a mold that imparts a shape to its material that corresponds to the floor structure 30a, while the carpeting 72 may, for example, be cut into a blank and formed in a heated mold to take a shape corresponding to the floor structure 30a.

With the floor structure 30a, the silencer 70 and the carpeting 72 all having corresponding shapes, during the assembly of vehicle 10, it is desirable for the silencer 70 and the carpeting 72 to be correctly located with respect to the floor structure 30a.

The floor structure 30a, like the remainder of the body structure 30, is rigid. With the silencer 70 shaped to correspond to the shape of the floor structure 30a, the silencer 70 may be located with respect to the floor structure 30a simply by laying it in position over the floor structure 30a, particularly in cases where the bottom surface of the silencer 70 is shaped to match the shape of the floor structure 30a and the silencer 70 rests in contact on the floor structure 30a.

However, although the carpeting 72 is likewise shaped to correspond to the shape of the floor structure 30a, in many cases it cannot be located with respect to the floor structure 30a in the same manner as the silencer 70.

Certain portions of the carpeting 72, such as opposed longitudinally extending peripheral edges 80, may ultimately be anchored, or directly connected, to the floor structure 30a of the body structure 30 during the assembly of the vehicle 10. In the case of the opposed longitudinally extending peripheral edges 80, these ultimately anchored portions of the carpeting 72 may be anchored respectively to one of the pair of spaced longitudinally extending side rails 32a, for example.

The carpeting 72 overlies the silencer 70 which, as pointed out above, is manually compressible, for instance by hand during the assembly of the vehicle 10. During the assembly of the vehicle 10, as the installer pushes, pulls and otherwise manipulates the carpeting 72 to position its ultimately anchored portions for anchoring to the floor structure 30a, the carpeting 72 may be subjected to forces tending to position other, unanchored portions of the carpeting 72, as well as, in some cases, the ultimately anchored portions of the carpeting 72, out of location with respect to the floor structure 30a.

The silencer 70, as a product of its compressibility, may compress as these forces are imparted to it by the carpeting 72, and permit the positioning of these unanchored portions of the carpeting 72, as well as ultimately anchored portions of the carpeting 72, if any, out of location. These unanchored portions of the carpeting 72 and ultimately anchored portions of the carpeting 72 may moreover remain positioned out of location once the ultimately anchored portions of the carpeting 72 are anchored.

To relocate the previously unanchored portions of the carpeting 72, some or all of them may, for example, be anchored to the floor structure 30a of the body structure 30 during the assembly of the vehicle 10. That is, some or all of the unanchored portions of the carpeting 72 described above may themselves be ultimately anchored portions of the carpeting 72. This, however, requires collaborative anchoring features at the ultimately anchored portions of the carpeting 72 or the floor structure 30a of the body structure 30, or both, which adds weight and cost to the vehicle 10, and moreover, adds time and complexity to an installer's task in assembling in the vehicle 10.

Figure 3:
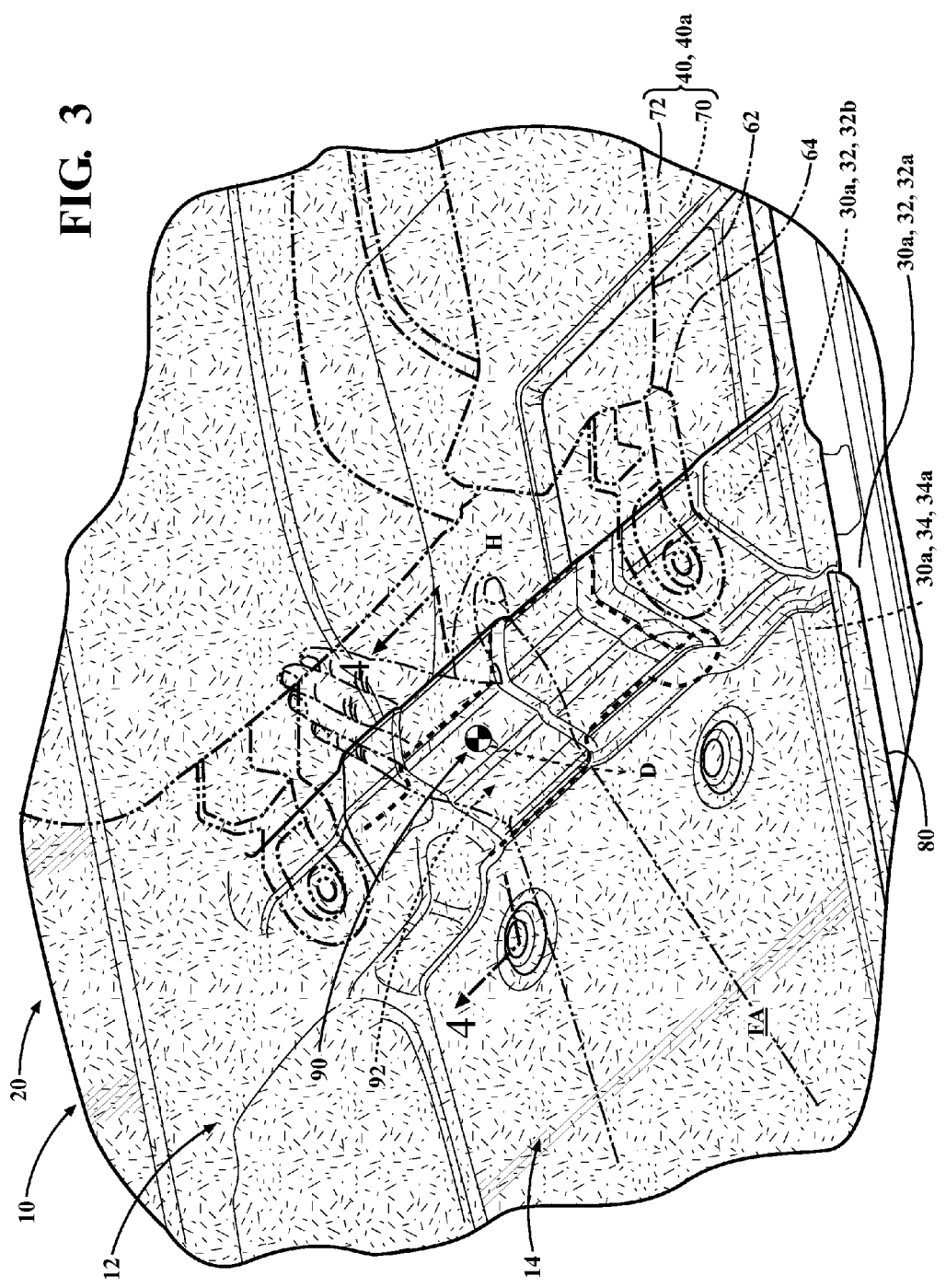
FIG. 3 is an alternative assembly view of the part of the vehicle shown in FIG. 1, showing a locator in a section of the carpeting overlying a datum location of the floor structure.
Figure 4:
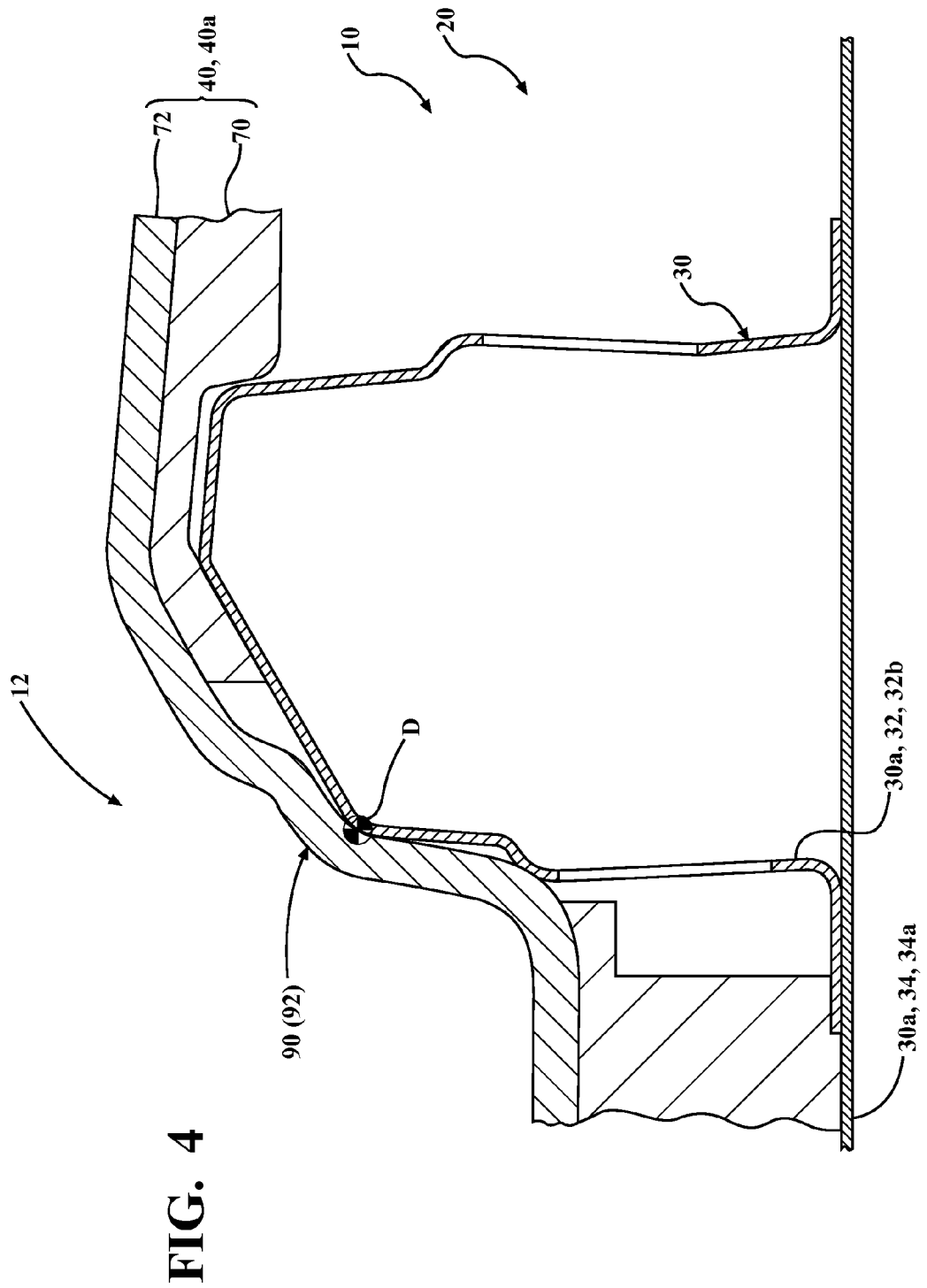
FIG. 4 is a cross sectional view of the part of the vehicle taken along the line 4-4 in FIG. 3, showing the floor structure's datum location, a relief defined in a section of the silencer overlying the floor structure's datum location, and the carpeting's locator accommodated within the silencer's relief and applied against the floor structure's datum location.

As shown with additional reference to FIGS. 3 and 4, the floor structure 30a has a datum location D over which a section of the silencer 70 and a section of the carpeting 72 lie. Although the positioning of the datum location D and the associated features of the silencer 70 and carpeting 72 are described generally with reference to the one datum location D shown, it will be understood that this description is applicable in principle to any number of otherwise positioned datum locations D, either alone or in combination with the one datum location D shown.

The section of the carpeting 72 overlying the datum location D of the floor structure 30a has a locator 90 that is generally configured for application against the datum location D. The silencer 70 defines a complementary recess for the locator 90 that is generally configured to accommodate the locator 90 and allow for its application against the datum location D.

In general, with the application of the locator 90 of the carpeting 72 against the datum location D of the floor structure 30a during the assembly of the vehicle 10, at least some of the carpeting 72, such as the portion of the carpeting 72 bordering the locator 90, is located with respect to the floor structure 30a in a direction of the application, notwithstanding that a section of the silencer 70 overlies the datum location D in addition to the section of the carpeting 72 having the locator 90.

The datum location D of the floor structure 30a may be located collaboratively with portions of the carpeting 72 ultimately anchored to the floor structure 30a. Generally speaking, for example, where an ultimately anchored portion of the capering 72, by its anchoring, locates some of the carpeting 72 with respect to the floor structure 30a in a given direction, the datum location D can be arranged so that the direction of the application of the locator 90 of the carpeting 72 against the datum location D is in another direction so that, as a result, at least some of the carpeting 72 is located with respect to the floor structure 30a in the other direction of the application as well.

In the case where the opposed longitudinally extending peripheral edges 80 are ultimately anchored to the floor structure 30a to locate some of the carpeting 72 with respect to the floor structure 30a in a transverse direction, for example, the datum location D can be arranged at an upright transversely extending face of the floor structure 30a so that the direction of the application of the locator 90 against the datum location D is a longitudinal direction so that, as a result, at least some of the carpeting 72 is located with respect to the floor structure 30a in the longitudinal direction of the application. The datum location D may, moreover, be arranged so that the carpeting 72 has the locator 90 in an inner section. According to this example, the datum location D may be arranged at an upright face of one of the transversely extending cross members 32b at the driver's seat area SA or other front seat area of the floor 20, for instance.

This may be advantageous, for instance, in a case where the anchoring of the opposed longitudinally extending peripheral edges 80 to the floor structure 30a, although locating some of the carpeting 72 with respect to the floor structure 30a in the transverse direction, does not locate the carpeting 72 with respect to the floor structure 30a in the longitudinal direction. In this case, following the application of the locator 90 against the datum location D, with at least some of the carpeting 72 being located with respect to the floor structure 30a in the longitudinal direction of the application, the opposed longitudinally extending peripheral edges 80 may be anchored to the floor structure 30a to locate some of the carpeting 72 with respect to the floor structure 30a in the transverse direction as well.

The locator 90 may be configured as any feature of the carpeting 72 that protrudes towards the datum location D of the floor structure 30a for application against it. The locator 90 may be shaped and sized, for example, as a recessed locating handhold against which an operator can push or pull with their hand H during the assembly of the vehicle 10 so that, as a result operator's pushing or pulling, as the case may be, at least some of the carpeting 72 is located with respect to the floor structure 30a in the direction of the application against the datum location D resulting from the operator's pushing or pulling. The locator 90, either in its configuration as a recessed locating handhold or other configurations, may be formed into the remainder of the section of the carpeting 72 overlying the datum location D, for example, in a heated mold. The silencer 70 can be defined as a relief hole through which the locator 90 may be applied in contact against the datum location D, for example.

The section of the carpeting 72 having the locator 90 may be, or include, an unanchored portion of the carpeting 72, such that with the section of the carpeting 72 overlying the datum location D of the floor structure 30a having a locator 90 configured for application against the datum location D, and with the silencer 70 defining a complementary recess for the locator 90 that is generally configured to accommodate the locator 90 and allow for its application against the datum location D, at least some of the carpeting 72 is located with respect to the floor structure 30a in a direction of the application, without the need to anchor that portion of the carpeting, obviating the need for collaborative anchoring features at that portion of the carpeting 72 or the floor structure 30a of the body structure 30.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle floor, comprising:
   a rigid floor structure having a datum location;
   a compressible sound attenuating silencer shaped to correspond to the shape of the floor structure, the silencer overlying the floor structure and defining a relief in a section overlying the floor structure's datum location; and
   carpeting shaped to correspond to the shape of the floor structure, the carpeting overlying the silencer and having a locator in a section overlying the floor structure's datum location, the locator protruding toward the floor structure's datum location and inside the silencer's relief, and applied against the floor structure's datum location to locate at least some of the carpeting with respect to the floor structure in a direction of the application.

2. The vehicle floor of claim 1, wherein the floor structure's datum location is at an upright face of the floor structure.

3. The vehicle floor of claim 1, wherein the floor structure's datum location is at a raised cross member for the floor structure.

4. The vehicle floor of claim 1, wherein the floor structure's datum location is in a front seat area of the floor structure.

5. The vehicle floor of claim 1, wherein the silencer's relief is a relief hole.

6. The vehicle floor of claim 5, wherein the carpeting's locator is applied in contact against the floor structure's datum location through the relief hole to locate at least some of the carpeting with respect to the floor structure in the direction of the application.

7. The vehicle floor of claim 1, wherein the carpeting's locator is a locating handhold, the locating handhold defining, at a top surface of the carpeting, a hand-sized recess in the section of the carpeting overlying the floor structure's datum location and, at a bottom surface of the carpeting, a corresponding protrusion that protrudes inside the silencer's relief.

8. The vehicle floor of claim 7, wherein the carpeting's locating handhold is formed into the section of the carpeting overlying the floor structure's datum location.

9. The vehicle floor of claim 1, wherein the carpeting has a peripheral edge and the locator in an inner section overlying the floor structure's datum location, with the peripheral edge anchored to the floor structure to locate at least some of the carpeting with respect to the floor structure in one direction, and the locator applied against the floor structure's datum location in another direction to locate at least some of the carpeting with respect to the floor structure in the other direction of the application.

10. The vehicle floor of claim 9, wherein the one direction is a transverse direction, and the other direction is a longitudinal direction.

11. A vehicle floor, comprising:
    a rigid floor structure having a datum location at a transversely extending upright face of a raised cross member for floor structure;
    a compressible sound attenuating silencer shaped to correspond to the shape of the floor structure, the silencer overlying the floor structure and defining a relief hole in a section overlying the floor structure's datum location; and
    carpeting shaped to correspond to the shape of the floor structure, the carpeting overlying the silencer and having opposed longitudinally extending peripheral edges and a locating handhold formed into an inner section overlying the floor structure's datum location, the peripheral edges anchored to the floor structure to locate at least some of the carpeting with respect to the floor structure in a transverse direction, and the locating handhold protruding toward the floor structure's datum location and applied in contact against the floor structure's datum location through the silencer's relief hole in a longitudinal direction to locate at least some of the carpeting with respect to the floor structure in the longitudinal direction of the application.

12. The vehicle floor of claim 11, wherein the carpeting's locating handhold defines, at a top surface of the carpeting, a hand-sized recess in the section of the carpeting overlying the floor structure's datum location and, at a bottom surface of the carpeting, a corresponding protrusion that protrudes through the silencer's relief.

13. A method of assembling a vehicle floor, comprising:
    lying, over a rigid floor structure having a datum location, a compressible sound attenuating silencer shaped to correspond to the shape of the floor structure, and defining a relief, with a section defining the relief overlying the floor structure's datum location;
    lying, over the silencer, carpeting shaped to correspond to the shape of the floor structure, and having a locator, with a section having the locator overlying the floor structure's datum location; and
    with the locator protruding inside the silencer's relief toward the floor structure's datum location, applying the carpeting's locator against the floor structure's datum location to locate at least some of the carpeting with respect to the floor structure in a direction of the application.

14. The method of claim 13, further comprising:
with the carpeting's locator applied against the floor structure's datum location to locate at least some of the carpeting with respect to the floor structure in a direction of the application, manipulating other portions of the carpeting to position them with respect to the floor structure.

15. The method of claim 13, wherein the floor structure's datum location is at an upright face of the floor structure.

16. The method of claim 13, wherein the silencer's relief is a relief hole, and applying includes applying the carpeting's locator in contact against the floor structure's datum location through the relief hole to locate at least some of the carpeting with respect to the floor structure in the direction of the application.

17. The method of claim 13, wherein:
the carpeting's locator is a locating handhold, the locating handhold defining, at a top surface of the carpeting, a hand-sized recess in the section of the carpeting overlying the floor structure's datum location and, at a bottom surface of the carpeting, a corresponding protrusion that protrudes inside the silencer's relief, and applying includes applying, by hand, the carpeting's locator against the floor structure's datum location to locate at least some of the carpeting with respect to the floor structure in a direction of the application.

18. The method of claim 17, wherein the carpeting's locating handhold is formed into the section of the carpeting overlying the floor structure's datum location.

19. The method of claim 13, wherein the carpeting has the locator in an inner section overlying the floor structure's datum location, further comprising:
anchoring a peripheral edge of the carpeting to the floor structure to locate at least some of the carpeting with respect to the floor structure in one direction, wherein:
applying includes applying the carpeting's locator against the floor structure's datum location in another direction to locate at least some of the carpeting with respect to the floor structure in the other direction of the application.

20. The method of claim 19, wherein the one direction is a transverse direction, and the other direction is a longitudinal direction.

* * * * *